（12） United States Patent
Zackariya (10) Patent No.: US 10,567,992 B2
(45) Date of Patent: Feb. 18, 2020

(54) NETWORK DEVICE KPI MONITORS BASED ON BITMAPS

(71) Applicant: Hewlett Packard Enterprise Development LP, Houston, TX (US)

(72) Inventor: Firdousi Farozan Zackariya, Chennai (IN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 211 days.

(21) Appl. No.: 15/880,125

(22) Filed: Jan. 25, 2018

(65) Prior Publication Data

US 2019/0230543 A1  Jul. 25, 2019

(51) Int. Cl.

| G06F 15/16 | (2006.01) |
|---|---|
| H04W 24/10 | (2009.01) |
| H04L 1/00 | (2006.01) |
| H04W 24/08 | (2009.01) |
| G06F 16/338 | (2019.01) |
| G06F 16/332 | (2019.01) |
| G06F 16/248 | (2019.01) |
| H04L 12/24 | (2006.01) |
| G06T 11/20 | (2006.01) |
| H04L 12/26 | (2006.01) |

(52) U.S. Cl.
CPC .......... *H04W 24/10* (2013.01); *G06F 16/248* (2019.01); *G06F 16/338* (2019.01); *G06F 16/3328* (2019.01); *H04L 1/0026* (2013.01); *H04L 41/0681* (2013.01); *H04W 24/08* (2013.01); *G06T 11/206* (2013.01); *H04L 43/08* (2013.01)

(58) Field of Classification Search
CPC .. H04L 43/08; H04L 41/0681; H04L 41/0631
USPC ................ 709/203, 220, 224, 226, 228, 232
See application file for complete search history.

(56) References Cited

U.S. PATENT DOCUMENTS

| 8,949,224 | B2 | 2/2015 | Gupta et al. |
|---|---|---|---|
| 9,390,158 | B2 | 7/2016 | Hunt et al. |
| 9,607,104 | B1 | 3/2017 | Turner et al. |
| 10,140,206 | B2 * | 11/2018 | Sapozhnikov ............ G06F 8/00 |
| 10,318,910 | B2 * | 6/2019 | Byrne ............... G06Q 10/06393 |
| 10,326,640 | B2 * | 6/2019 | Froehlich ............ H04L 41/0631 |
| 10,432,488 | B2 * | 10/2019 | Zhao |
| 2008/0270363 | A1 | 10/2008 | Hunt et al. |

(Continued)

OTHER PUBLICATIONS

Oracle Help Center, Comparison of Aggregate and Block Storage, (Research Paper), Jan. 29, 2015, 13 Pgs.

*Primary Examiner* — Khanh Q Dinh
(74) *Attorney, Agent, or Firm* — Tong, Rea, Bentley & Kim, LLC (57) ABSTRACT

In example implementations, a method is provided. The method collects key performance indicator (KPI) data of a plurality of network devices periodically. The KPI data of each one of the plurality of network devices is converted into a bitmap for each time period that the KPI data is collected. A number of the plurality of network devices that have exceeded a KPI threshold is detected based on the bitmap for the each time period. A determination is made that the number of the plurality of network devices exceeds a number threshold. In response to the determination, a time series graphical image of the KPI data for the each time period is generated based on the bitmap for the each time period.

20 Claims, 6 Drawing Sheets

(56) References Cited

U.S. PATENT DOCUMENTS

| | | | |
|---|---|---|---|
| 2014/0364114 A1* | 12/2014 | Zhao | H04W 52/0206 |
| | | | 455/424 |
| 2015/0379452 A1* | 12/2015 | Byrne | G06Q 10/06393 |
| | | | 705/7.37 |
| 2016/0034504 A1 | 2/2016 | Borah et al. | |
| 2016/0203172 A1 | 7/2016 | Attaluri et al. | |
| 2016/0241429 A1* | 8/2016 | Froehlich | H04L 41/0631 |
| 2017/0031939 A1 | 2/2017 | Wenzel et al. | |
| 2017/0139816 A1* | 5/2017 | Sapozhnikov | G06F 8/00 |

* cited by examiner

NETWORK DEVICE KPI MONITORS BASED ON BITMAPS

BACKGROUND

Network devices may operate to transport information and data packets across a managed network. Some network service providers may want to monitor the performance of the network devices to ensure that the network operates in accordance with service level agreements with customers.

The network devices can be monitored for certain key performance indicators (KPI). The KPI data can help a network service provider to objectively determine whether the network is operating properly.

DETAILED DESCRIPTION

Examples described herein provide a method and system that monitors network devices' KPIs based on bitmaps. As discussed above, some network service providers may monitor KPI data of network devices to ensure proper network operation. Currently, data may be collected periodically and the data may be stored and processed as a string of data. For example, the string of data may include ASCII characters, text, or numbers that can be expensive to store when collecting large amounts of data, expensive to process, and expensive to analyze. On the other hand, to optimize the data storage and processing, the data can be aggregated and stored, rather than storing the raw data, which may produce inaccurate results.

The examples of the present disclosure provide network device KPI monitors based on bitmaps. For example, data for each network device for a particular KPI may be collected periodically. The data can be arranged in a bitmap data structure. For example, each network device may be represented by a bit position in the bitmap and the bit may have a value of 1 for exceeding the KPI threshold or 0 for failing to exceed the KPI threshold.

The bitmaps for each time period can then be quickly aggregated to calculate relevant data that can be used to generate graphs. The bitmaps may provide more efficient processing of the data and more accurate results than storing and processing data strings, as discussed in further detail below.

Figure 1:
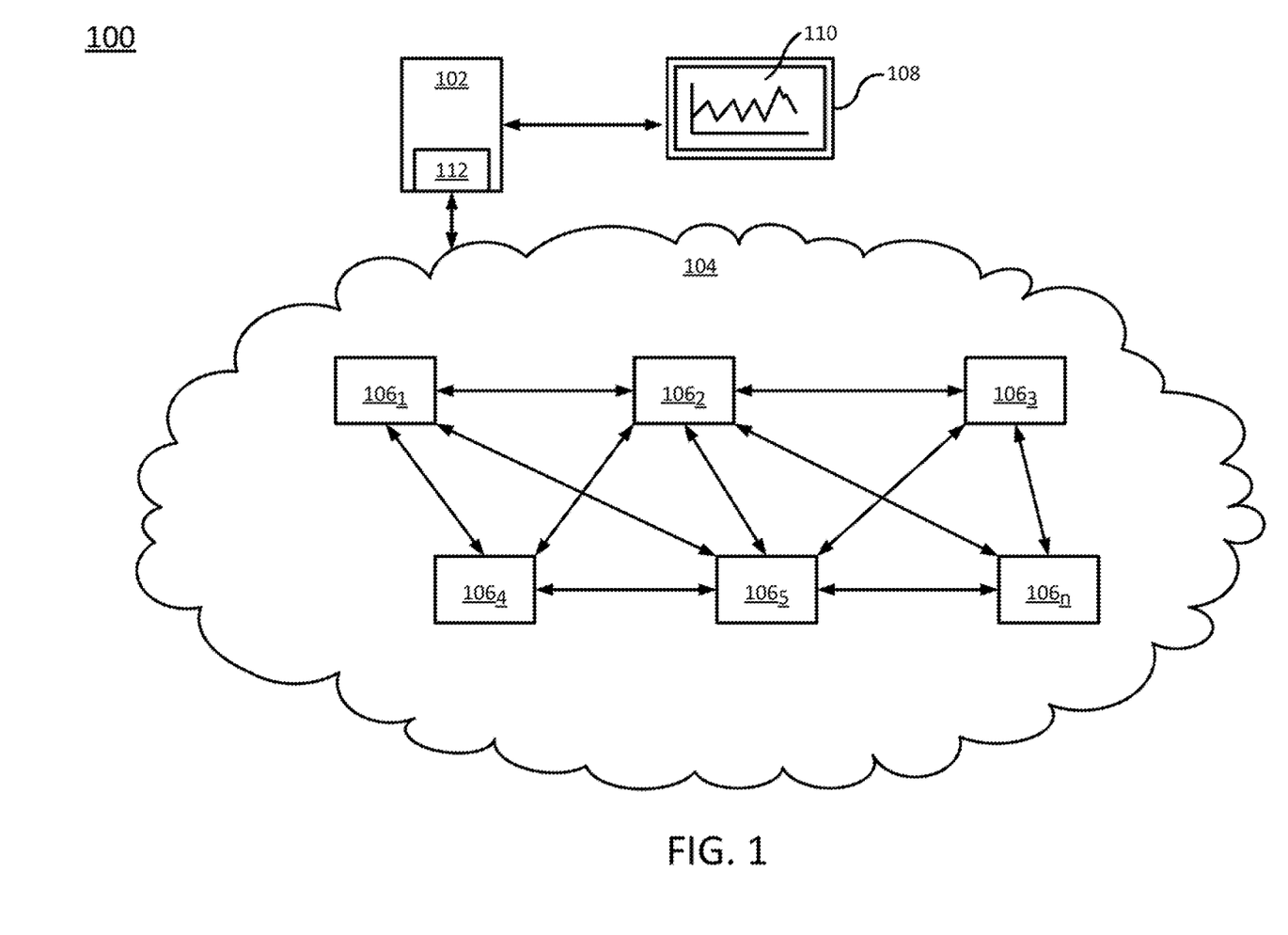
FIG. 1 is a block diagram of an example network of the present disclosure.

FIG. 1 illustrates a network 100 of the present disclosure. In one example, the network 100 may include a client site network 104, a centralized monitor 102, and an endpoint device 108. In one example, the endpoint device 108 may be any type of device with a processor, a memory, and a display 110. For example, the endpoint device 108 may be a desktop computer with a monitor, a lap top computer, a smart phone, a tablet computer, and the like.

In one example, the client site network 104 may include a plurality of network devices $106_1$ to $106_n$ (hereinafter also referred to individually as a network device 106 or collectively as network devices 106). The network devices 106 may be any type of network device such as a router, a switch, an access point, a gateway, a server, a networked storage device, a shared processing resource, a customer endpoint device, and the like.

In one example, the centralized monitor 102 may be communicatively coupled to the client site network 104 and each network device 106 in the client site network 104. The centralized monitor 102 may also be communicatively coupled to the endpoint device 108. The centralized monitor 102 may include a communication interface 112 to establish a wired or wireless connection to the endpoint device 108 and the network devices 106.

In one example, the centralized monitor 102 may communicate with the network devices 106 to collect data from each one of the network devices 106. The centralized monitor 102 may monitor a performance of the client site network 104. The centralized monitor 102 may be remotely located from the client site network 104 and be operated by a service provider that is different than the client that operates the client site network 104. For example, the client site network 104 may be operated by a client or a customer. The service provider may monitor key performance indicator (KPI) data of the network devices 106 for the client.

Figure 4:
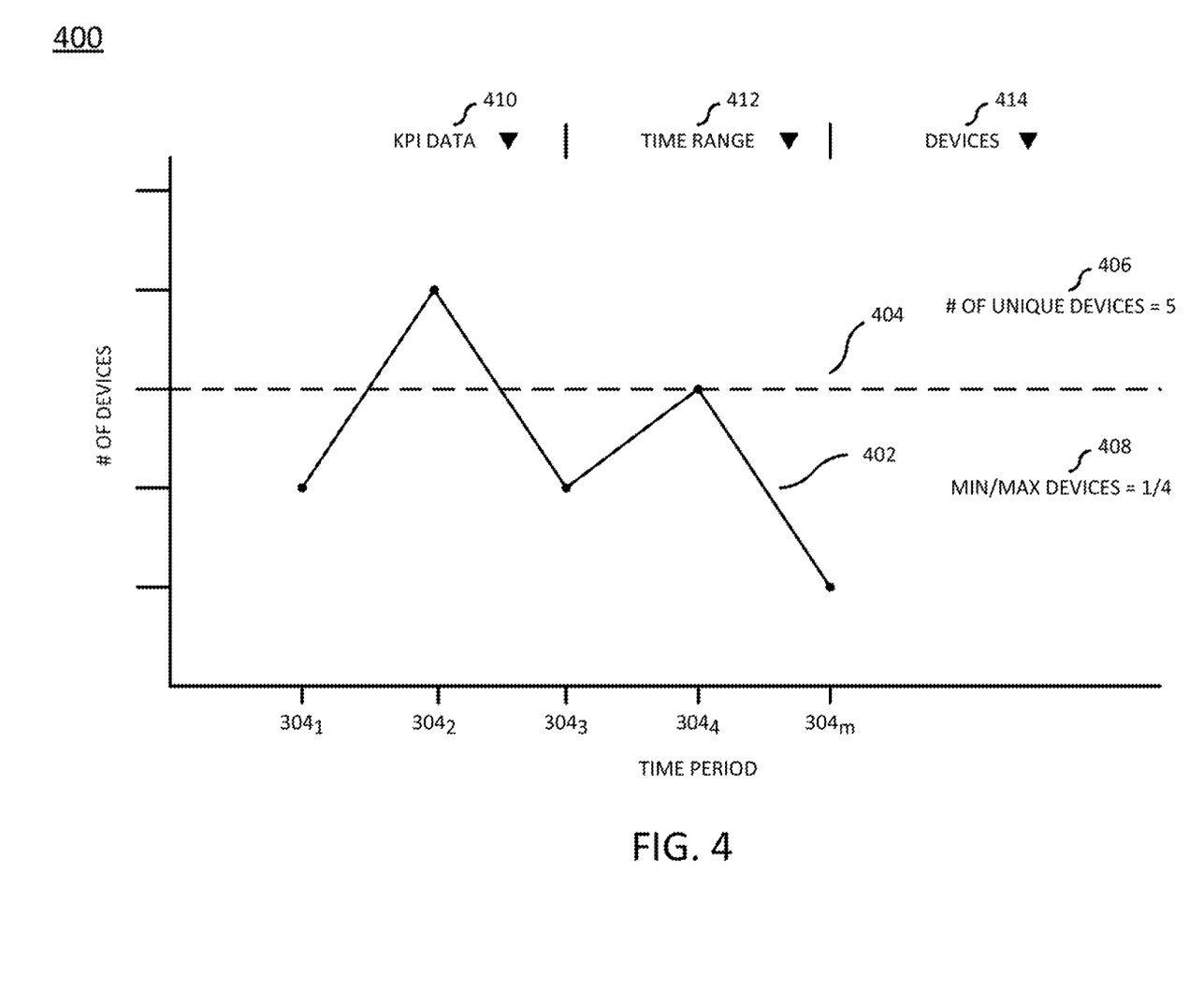
FIG. 4 illustrates an example time series graphical image of the KPI data that is generated based on the bitmap of the present disclosure.

In one example, the KPI data may be displayed on the display 110 of the endpoint device 108. For example, a user may select which KPI data they would like to view and the data may be shown on the display 110. The types of graphs generated based on the KPI data are illustrated in FIG. 4, and discussed in further details below. The KPI data may be any type of KPI data that may be monitored. Examples of KPI data that may be collected may include a CPU utilization, a memory utilization, a channel utilization, a noise floor, a client health score, a device state (e.g., up or down), and the like.

Although a single client site network 104 is illustrated in FIG. 1, it should be noted that the centralized monitor 102 may monitor any number of client site networks 104. In addition, although a single centralized monitor 102 is illustrated in FIG. 1, it should be noted that the service provider may have a plurality of centralized monitors 102 for a plurality of different client site networks 104.

Figure 2:
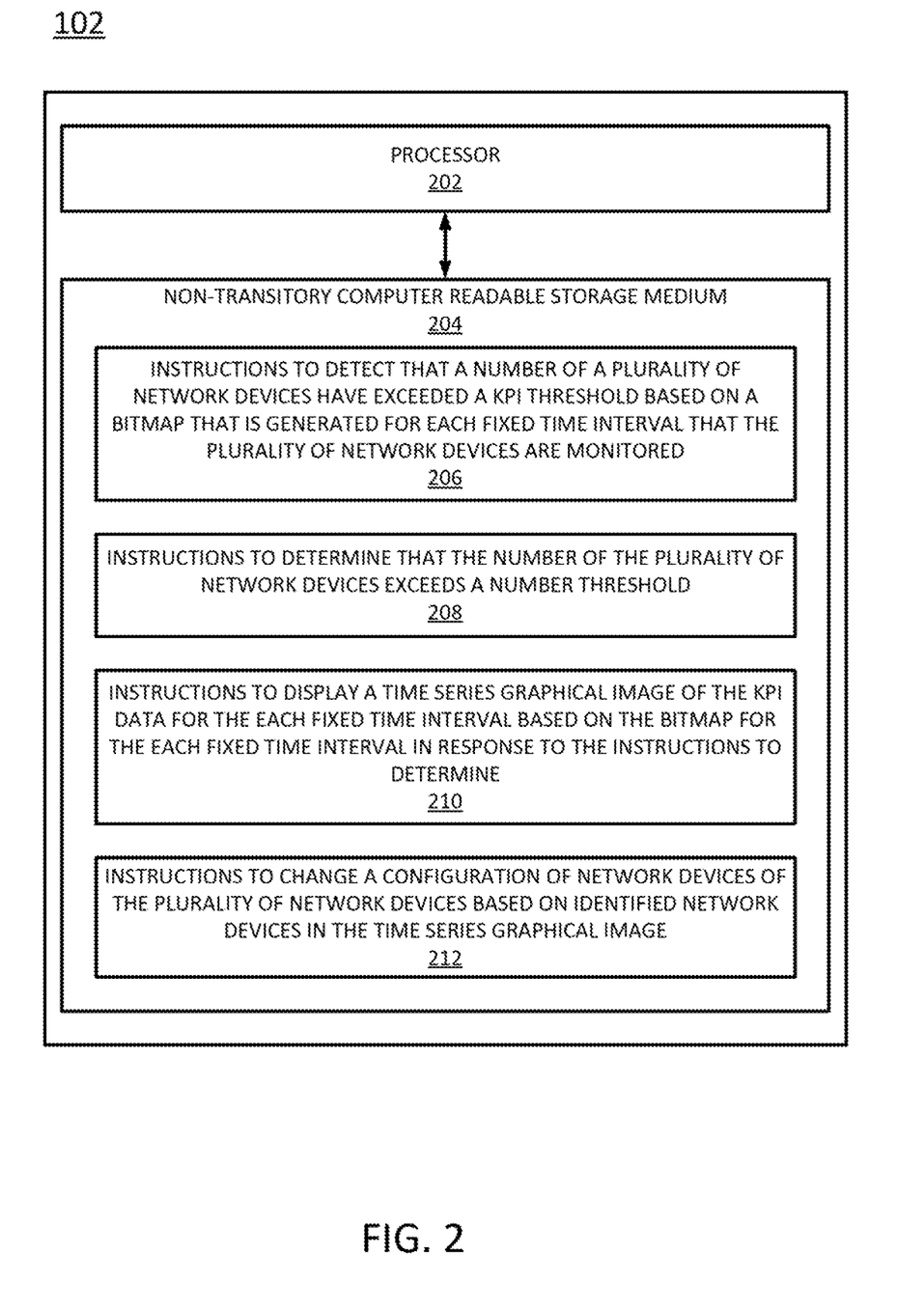
FIG. 2 is a block diagram of an example apparatus of the present disclosure.

FIG. 2 illustrates an example of the centralized monitor 102. In one example, the centralized monitor 102 may be an apparatus with a processor 204 and a non-transitory computer readable storage medium 204. The non-transitory computer readable storage medium 204 may include instructions 206, 208, 210, and 212 that are executed by the processor.

In one example, the instructions 206 may include instructions to detect that a number of a plurality of network devices 106 have exceeded at least one KPI threshold based on a bitmap that is generated for each fixed time interval that the plurality of network devices 106 are monitored. For example, data from the network devices 106 may be collected periodically or at fixed time intervals (e.g., every 30 seconds, every minute, every 15 minutes, every hour, and the like). Each data point may be date and time stamped and include an identification of each network device 106 and the KPI data associated with that network device 106. Table 1 below illustrates an example of KPI data that may be collected for CPU utilization for a fixed time interval of every thirty seconds.

TABLE 1

EXAMPLE KPI DATA

| | $106_1$ - | $106_2$ - | $106_3$ - | $106_4$ - | $106_5$ - | $106_n$ - |
|---|---|---|---|---|---|---|
| 12-27-17 12:20:00 | 40% | 25% | 85% | 50% | 89% | 17% |
| 12-27-17 12:20:30 | 90% | 25% | 69% | 88% | 91% | 79% |
| 12-27-17 12:21:00 | 92% | 25% | 76% | 65% | 72% | 70% |

Previously, the data may be processed and stored as a string of the ASCII text and numbers. Storing each string of data could be costly with respect to storage resources. Processing could also be costly when processing the strings of data for hundreds of network devices 106. For example, the centralized monitor 102 may monitor which network devices exceed a KPI threshold for CPU utilization of 75%. When processing the strings of data in TABLE 1, the centralized monitor 102 would have to process large amounts of text to determine that network devices $106_3$ and $106_5$ exceeded the KPI threshold in the first data set, that the network devices $106_1$, $106_4$, $106_5$ and $106_n$ exceeded the KPI threshold in the second data set, and so forth. In addition, storing which network devices 106 exceeded the threshold would consume large amounts of storage space as large amounts of text would be stored.

In addition, processing the strings of data could also lead to inaccurate results. For example, at 12:20:00 and 12:21:00 data processing would determine that two unique network devices 106 exceeded the KPI threshold for each time period (e.g., 12:20:00 has network devices $106_3$ and $106_5$ and 12:21:00 has network devices $106_1$ and $106_3$). Since storing and processing the strings of data may be expensive, the data may be aggregated and the aggregated data may be stored. In other words, instead of storing actual device IDs that have exceeded the KPI threshold, the count of devices above the KPI threshold may be stored.

As a result, in the above example, the number of devices that have exceeded the KPI threshold at 12:20:00 and 12:21:00 may be stored as a value of two for each time period. When the actual time series data is used, the data may be averaged out and a value of two may be returned as the largest number of unique devices collected from the string of data due to storage of the aggregated data (e.g., the value of 2 rather than each unique ID of the network devices 106). However, this would be incorrect as the correct answer is three ($106_1$, $106_3$, and $106_5$).

Figure 3:
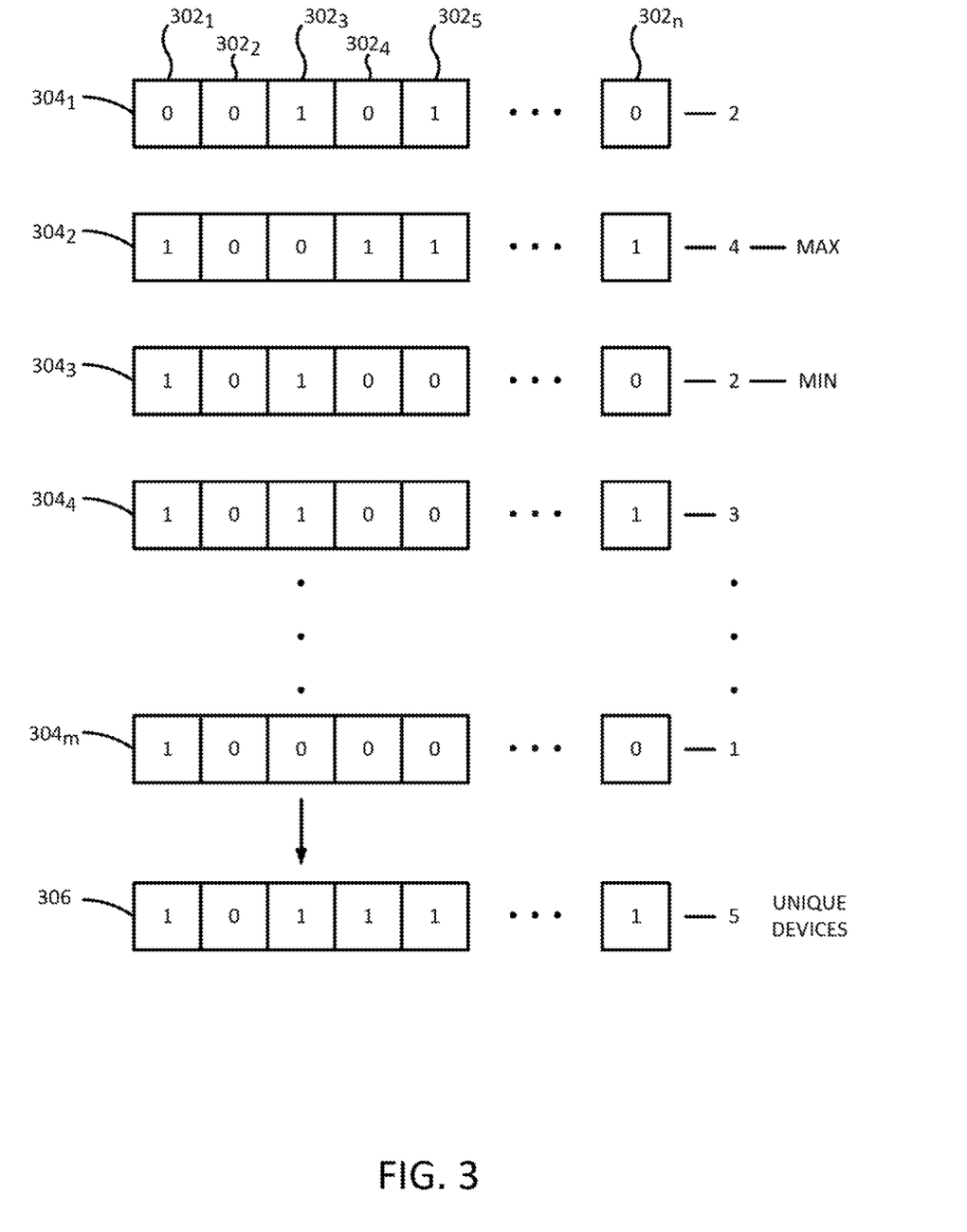
FIG. 3 illustrates an example bitmap of the present disclosure.

The present disclosure uses bitmaps to provide a more efficient storage and processing of the KPI data that is collected and provides more accurate calculations. FIG. 3 illustrates example bitmaps $304_1$ to $304_m$ (hereinafter referred to individually as a bitmap 304 or collectively as bitmaps 304) that are calculated or generated for the strings of data similar to the data strings shown in TABLE 1. In one example, a bitmap 304 may be generated for each time period or fixed time interval that the KPI data is collected.

The bitmap 304 may include a single bit $302_1$ to $302_n$ (also referred to herein individually as a bit 302 or collectively as bits 302) for each network device $106_1$ to $106_n$. Thus, if there were 200 network devices, there would be 200 bits per bitmap 304. A mapping of the bits 302 to the network devices 106 may be stored in memory of the centralized monitor 102.

In one example, each bit $302_1$ to $302_n$ may store a value of zero or one based on whether the respective network device 106 exceeds the KPI threshold for a particular KPI that is being monitored. Using the above example, the first data set collected at 12-27-17, 12:20:00 may be stored in the bitmap $304_1$. The network device $106_1$ had a CPU utilization that was below the threshold of 75%. As a result, the bit $302_1$ associated with the network device $106_1$ may store a value of zero. Similarly, the bit $302_2$ associated with the network device $106_2$ may store a value of zero. The bit $302_3$ associated with the network device $106_3$ may store a value of one (e.g., the CPU utilization for the network device $106_3$ is 85%, which is above the threshold of 75%), and so forth.

Each subsequent bitmap $304_2$ to $304_m$ may be generated in a similar fashion. For each bitmap 304, the number of network devices 106 that exceeded the KPI threshold may be calculated by summing the number of bits 302 that store a value of one. Thus, when calculating results such as a minimum and a maximum number of network devices 106 that exceeded the KPI threshold, the centralized monitor 102 may simply compare the sum of bits 302 having a stored value of one for each bitmap 304.

In addition, a total bitmap 306 may be generated to calculate a total number of unique network devices 106 that exceeded the KPI threshold. For example, the total bitmap 306 may be generated by applying an "OR" operation on each respective bit 302 of each bitmap 304. For example, for the bit $302_1$ for each bitmap $304_1$ to $304_m$ may be 0 OR 1 OR 1 OR 1 OR 1, which equals 1. Each bit 302 for the total bitmap 306 may be similarly calculated. The total number of unique network devices 106 may then be calculated by totally the bits 302 that have a stored value of one in the total bitmap 306. For the example illustrated in FIG. 3, the total number of unique network devices 106 that exceeded the KPI threshold may be five.

Thus, the use of the bitmaps 304 provides a more efficient way to store and process the KPI data that is collected. Providing a more efficient way to process the KPI data may allow the centralized monitor 102 to more quickly respond to problems detected based on the analysis of the KPI data and generate graphs of the KPI data more quickly for further analysis by a technician.

Returning to FIG. 2, the instructions 208 may include instructions to determine that the number of the plurality of network devices exceeds a number threshold. Using the above example, if the number of network devices 106 exceeds a number threshold, the centralized monitor 102 may change a configuration of at least one network device of the network devices $106_1$ to $106_n$. For example, the number threshold may be three. If more than three network devices 106 exceed the KPI threshold for a particular time period, the centralized monitor 102 may take action or make a change to at least one network device 106.

In another example, the number threshold may be for an entire window of time. For example, the number threshold may be for an accumulated total of network devices that exceed the particular KPI threshold over the window of time that the KPI data is collected.

Examples of changes may include configuring a back-up network device 106 to turn on, changing a configuration of a network device 106 to perform a different operation to improve a particular KPI that is being monitored, reducing, delaying, or holding incoming data to the client site network 104, restarting a network device 106 that may be down that could cause other network devices 106 to be over worked, and so forth.

The instructions 210 may include instructions to display a time series graphical image of the KPI data for the each fixed time interval based on the bitmap for the each fixed time interval in response to the instructions to determine 208. FIG. 4 illustrates an example time series graphical image 400. The time series graphical image 400 may be shown on the display 110 of the endpoint device 108.

In one example, the time series graphical image 400 may include a time series graph 402 based on the data from each bitmap $304_1$ to $304_m$ collected at a particular fixed time interval. The time series graph 402 may be generated based on a particular time range. For example, the time range may have been thirty minutes and the fixed time interval may have been every five minutes. As a result, the bitmaps 304 may be generated for each fixed time interval of five minutes and the time series graph 402 may include data for each five minute interval over a 30 minute time range.

In one example, the time series graphical image 400 may display a number threshold 404. As noted above, the time series graphical image 400 may show that at the fixed time interval associated with the bitmap $304_2$ that the total number of network devices 106 that exceeded the KPI threshold for CPU utilization was four, which was above the number threshold 404. As a result, the centralized monitor 102 may initiate a change to at least one network device 106 at that time.

In one example, the time series graphical image 400 may also include a total number of unique devices 406 and a min/max devices 408. The total number of unique devices 406 may be calculated based of the total bitmap 306, described above and illustrated in FIG. 3. The min/max devices 408 may be based off of a comparison of each bitmap 304 as described above and illustrated in FIG. 3.

In one example, the time series graphical image 400 may also include various drop down menus 410, 412, and 414. For example, the drop down menu 410 may allow a user to select which KPI data to be displayed as the time series graph 402. The drop down menu 412 may allow a user to select a desired time range. The drop down menu 414 may allow a user to select a particular type of network devices 106 (e.g., routers, switches, gateways), subset of network devices 106 (e.g., network devices 106 that have been installed the past 30 days, network devices 106 on a particular internet protocol (IP) address, and the like), a particular group of network devices 106 in a particular customer site network 104, and the like.

It should be noted that FIG. 4 illustrates one example time series graphical image 400. For example, the time series graphical image 400 may include additional drop down menus for different parameters, the appearance may be modified (e.g., including shading below the time series graph 402), the arrangement of the displayed data may be rearranged, and the like. For example, the drop down menus may also include menus to allow selection of the KPI threshold. For example, for CPU Utilization KPI, the possible thresholds allowed could be 70%, 80%, or 90%.

Referring back to FIG. 2, the instructions 212 may include instructions to change a configuration of network devices of the plurality of network devices 106 based on identified network devices in the time series graphical image 400. As described above, the centralized monitor 102 may detect that the number threshold 404 was exceeded. The centralized monitor 102 may identify from the bitmap $304_2$ collected at the particular fixed time interval that the network devices $106_1$, $106_4$, $106_5$, and $106_n$ exceeded the KPI threshold. The centralized monitor 102 may then change a configuration of the network devices $106_1$, $106_4$, $106_5$, and $106_n$ identified form the time series graphical image 400. As noted above, the change may include rebooting the network devices $106_1$, $106_4$, $106_5$, and $106_n$, adding processing resources to the network devices $106_1$, $106_4$, $106_5$, and $106_n$, and the like.

Thus, the use of the bitmaps 304 of the present disclosure allows the centralized monitor 102 to quickly process the KPI data and reduce the overall storage costs to store the KPI data. The more efficient processing of the KPI data using the bitmaps 304 allows the centralized monitor 102 to improve response times to issues detected at a customer site network 104 and generate the time series graphical images 400 more quickly.

Figure 5:
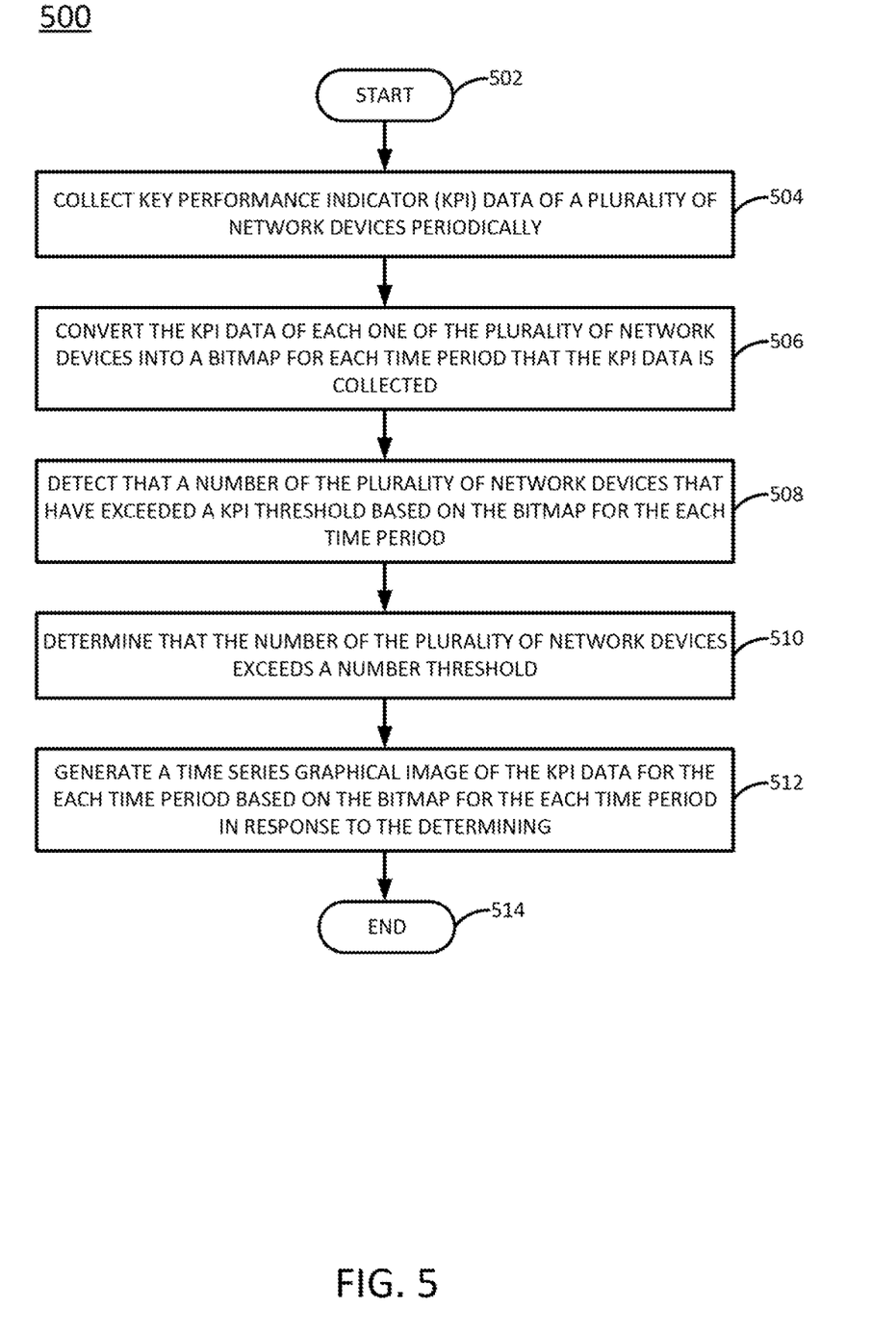
FIG. 5 is a flow chart of an example method for generating a time series graphical image of key performance indicator data based on bitmaps.

FIG. 5 illustrates a flow diagram of an example method 500 for generating a time series graphical image of key performance indicator data based on bitmaps. In one example, the method 500 may be performed by the centralized monitor 102 or the apparatus 600 illustrated in FIG. 6 and described below.

At block 502, the method 500 begins. At block 504, the method 500 collects key performance indicator (KPI) data of a plurality of network devices periodically. For example, the KPI data could be for a particular KPI or for a plurality of different KPI such as a computer (CPU) utilization, a memory utilization, a channel utilization, a noise floor, a client health score, a number of down devices, and the like. The KPI data can be collected periodically for each time period or a fixed time interval. For example, the KPI data can be collected every 30 seconds, every minute, every 30 minutes, or any desired time period.

At block 506, the method 500 converts the KPI data of each one of the plurality of network devices into a bitmap for each time period that the KPI data is collected. For example, each time period that the KPI data is collected, the KPI data may be converted into a bitmap as described above and illustrated in FIG. 3. For example, each bit of the bitmap may represent one of the network devices. Thus, if there are 200 network devices, each bitmap may have 200 bits. Each bit may store a value of one or zero based on whether the KPI associated with the network devices exceeded, or fell below, the KPI threshold. A mapping of which bit is associate with which network device may be stored in the memory of the centralized monitor.

At block 508, the method 500 detects that a number of the plurality of network devices that have exceeded a KPI threshold based on the bitmap for the each time period. For example, for each bitmap, the number of bits that have a value of one may be added or totaled. The total number of bits that have a value of 1 would equal the number of the plurality of network devices that have exceeded the KPI threshold for the time period that the KPI data was collected.

At block 510, the method 500 determines that the number of the plurality of network devices exceeds a number threshold. For example, the number of the plurality of network devices that have exceeded the number threshold may be for a particular time period. In another example, the number threshold may be for an entire window of time that the data is collected.

At block 512, the method 500 generates a time series graphical image of the KPI data for the each time period based on the bitmap for the each time period in response to the determining. An example of the time series graphical image is provided above and discussed with respect to FIG. 4.

In one example, the method 500 may change a configuration of a subset of network devices of the plurality of network devices. For example, the subset of network devices may include those network devices that are identified to exceed the particular KPI threshold when the number threshold is exceeded. The change may include restarting the network device, reconfiguring how the network device operates, adding resources to the network device, and the like. At block 510, the method 500 ends.

Figure 6:
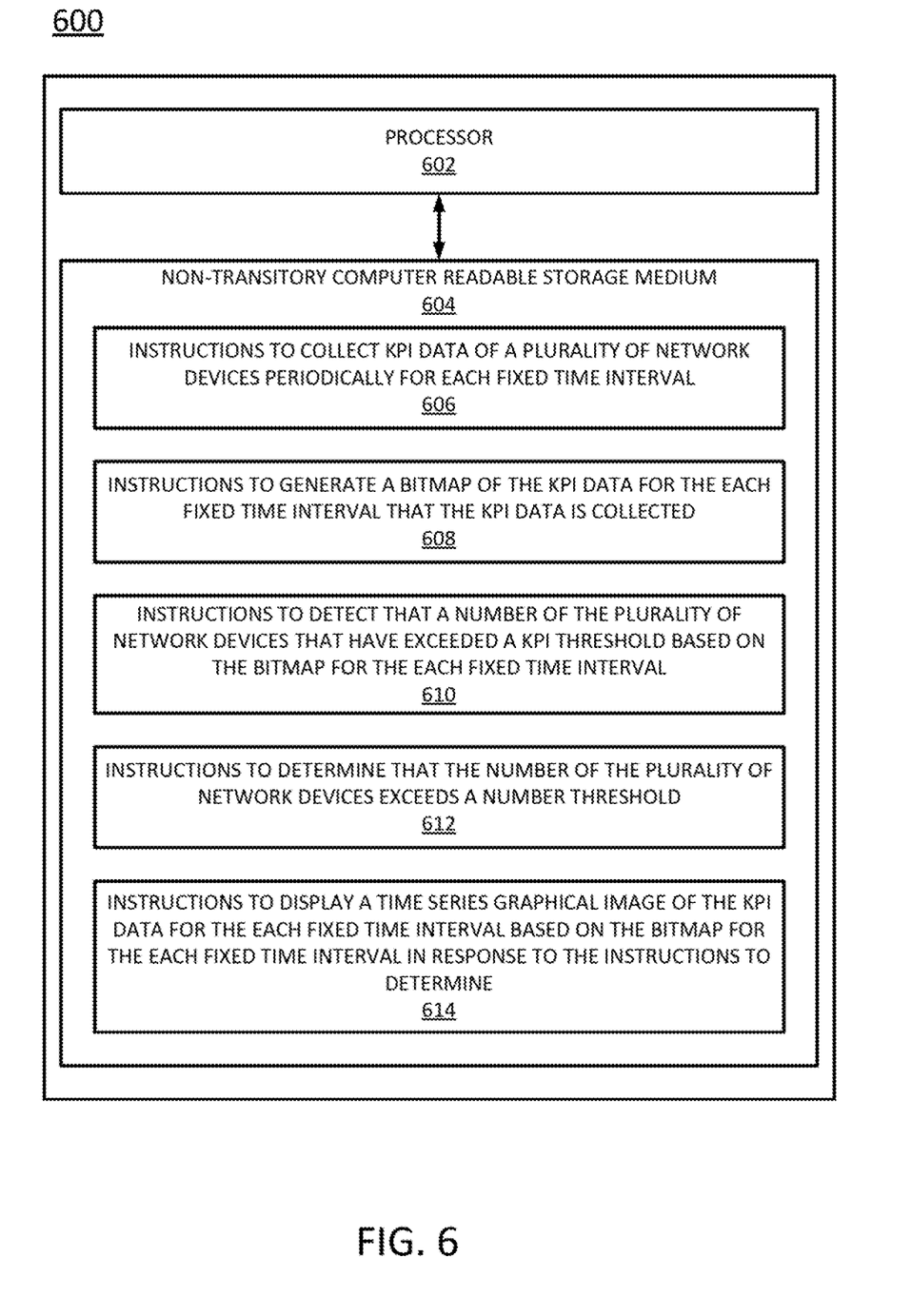
FIG. 6 is a block diagram of an example non-transitory computer readable storage medium storing instructions executed by a processor.

FIG. 6 illustrates an example of an apparatus 600. In one example, the apparatus 600 may be the apparatus 100 illustrated in FIG. 1. In one example, the apparatus 600 may include a processor 602 and a non-transitory computer readable storage medium 604. The non-transitory computer readable storage medium 604 may include instructions 606, 608, 610, 612, and 614 that, when executed by the processor 602, cause the processor 602 to perform various functions.

In one example, the instructions 606 may include instructions to collect key performance indicator (KPI) data of a plurality of network devices periodically for each fixed time interval. The instructions 608 may include instructions to generate a bitmap of the KPI data for the each fixed time interval that the KPI data is collected. The instructions 610 may include instructions to detect that a number of the plurality of network devices that have exceeded a KPI threshold based on the bitmap for the each fixed time interval. The instructions 612 may include instructions to determine that the number of the plurality of network devices exceeds a number threshold. The instructions 614 may include instructions to display a time series graphical image of the KPI data for the each fixed time interval based on the bitmap for the each time period in response to the instructions to determine.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A method, comprising:
    collecting, by a processor, key performance indicator (KPI) data of a plurality of network devices periodically;
    converting, by the processor, the KPI data of each one of the plurality of network devices into a bitmap for each time period that the KPI data is collected;
    detecting, by the processor, that a number of the plurality of network devices that have exceeded a KPI threshold based on the bitmap for the each time period;
    determining, by the processor, that the number of the plurality of network devices exceeds a number threshold; and
    generating, by the processor, a time series graphical image of the KPI data for the each time period based on the bitmap for the each time period in response to the determining.

2. The method of claim 1, wherein the KPI data comprises at least one of: a computer (CPU) utilization, a memory utilization, a channel utilization, a noise floor, a client health score, or a number of down devices.

3. The method of claim 1, wherein the converting comprises:
    assigning, by the processor, a different bit of the bitmap to the each one of the plurality of network devices;
    setting, by the processor, each bit of the bitmap to a value of one for a respective network device of the plurality of network devices that exceeds the KPI threshold or a value of zero for the respective network device of the plurality of network devices that falls below the KIP threshold; and
    repeating, by the processor, the assigning and the setting for the each time period that the KPI data is collected.

4. The method of claim 1, wherein the detecting comprises:
    calculating, by the processor, a total number of bits of the bitmap that has a value of 1.

5. The method of claim 4, wherein the determining comprises:
    comparing, by the processor, the total number of bits to the number threshold.

6. The method of claim 1, wherein the time series graphical image of the KPI data displays a maximum number of network devices that exceeded the KPI threshold within a time period of the each time period.

7. The method of claim 1, wherein the time series graphical image of the KPI data displays a minimum number of network devices that exceeded the KPI threshold within a time period of the each time period.

8. The method of claim 1, wherein the time series graphical image of the KPI data displays a total unique number of network devices that exceeded the KPI threshold.

9. The method of claim 8, wherein the total unique number of network devices is calculated by applying an OR operation to corresponding bits of each bitmap of the each time period that the KPI data is collected.

10. The method of claim 1, further comprising:
    changing, by the processor, a configuration of network devices of the plurality of network devices that have exceeded the KPI threshold.

11. A non-transitory computer readable storage medium encoded with instructions executable by a processor of a memory device, the non-transitory computer-readable storage medium comprising:
    instructions to collect key performance indicator (KPI) data of a plurality of network devices periodically for each fixed time interval;
    instructions to generate a bitmap of the KPI data for the each fixed time interval that the KPI data is collected;
    instructions to detect that a number of the plurality of network devices that have exceeded a KPI threshold based on the bitmap for the each fixed time interval;
    instructions to determine that the number of the plurality of network devices exceeds a number threshold; and
    instructions to display a time series graphical image of the KPI data for the each fixed time interval based on the bitmap for the each fixed time interval in response to the instructions to determine.

12. The non-transitory computer readable storage medium of claim 11, wherein the instructions to generate comprise:
    instructions to assign a different bit of the bitmap to the each one of the plurality of network devices;
    instructions to set each bit of the bitmap to a value of one for a respective network device of the plurality of network devices that exceeds the KPI threshold or a value of zero for the respective network device of the plurality of network devices that falls below the KIP threshold; and
    instructions to repeat the instructions to assign and the instructions to set for the each fixed time interval that the KPI data is collected.

13. The non-transitory computer readable storage medium of claim 11, wherein the instructions to detect comprise:
    instructions to calculate a total number of bits of the bitmap that has a value of 1.

14. The non-transitory computer readable storage medium of claim 13, wherein the instructions to determine comprise:
  instructions to compare the total number of bits to the number threshold.

15. The non-transitory computer readable storage medium of claim 11, wherein the instructions to display comprises:
  instructions to display a maximum number of network devices that exceeded the KPI threshold within the each fixed time interval.

16. The non-transitory computer readable storage medium of claim 11, wherein the instructions to display comprises:
  instructions to display a minimum number of network devices that exceeded the KPI threshold within the each fixed time interval.

17. The non-transitory computer readable storage medium of claim 11, wherein the instructions to display comprises:
  instructions to display a total unique number of network devices that exceeded the KPI threshold.

18. The non-transitory computer readable storage medium of claim 17, wherein the total unique number of network devices is calculated by applying an OR operation to corresponding bits of each bitmap of the each fixed time interval that the KPI data is collected.

19. An apparatus, comprising:
  a processor; and
  a non-transitory computer readable storage medium encoded with instructions executable by a processor of a memory device, the non-transitory computer-readable storage medium comprising:
    instructions to detect that a number of a plurality of network devices have exceeded a KPI threshold based on a bitmap that is generated for each fixed time interval that the plurality of network devices are monitored;
    instructions to determine that the number of the plurality of network devices exceeds a number threshold;
    instructions to display a time series graphical image of the KPI data for the each fixed time interval based on the bitmap for the each fixed time interval in response to the instructions to determine; and
    instructions to change a configuration of network devices of the plurality of network devices based on identified network devices in the time series graphical image.

20. The apparatus of claim 19, further comprising:
  a communication interface to transmit a control signal to the plurality of network devices.

* * * * *